Patented Jan. 17, 1933

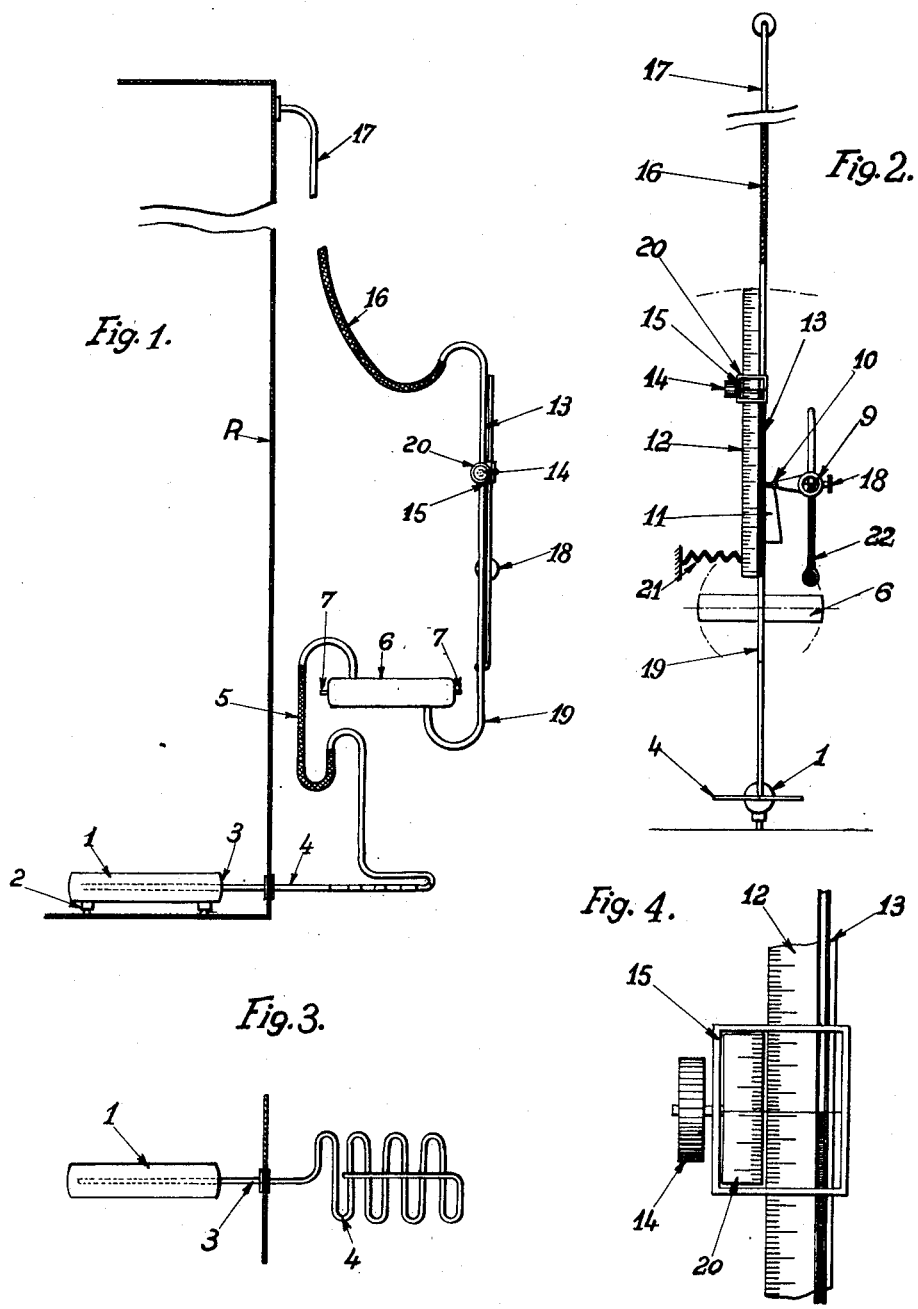

1,894,366

UNITED STATES PATENT OFFICE

SERVAN GEORGES CANTACUZENE, OF PARIS, FRANCE

PRESSURE GAUGE AUTOMATICALLY CORRECTING THE TEMPERATURE

Application filed March 3, 1932, Serial No. 596,586, and in Rumania March 26, 1931.

The pressure gauge forming the subject-matter of the present invention is more particularly adapted to be used for the gravimetric measurement of liquids contained in tanks, but this indication of utilization is not limitative.

Actually, for instance in the petroleum industry, the measurement of the quantity of liquid contained in a tank is volumetrically effected, and for transforming the volume into weight, the average density of the liquid is measured. Both measurements are liable to be erroneous. The use of a pressure gauge indicating the pressure per unit of surface on the bottom of the tank (pressure which, multiplied by the known horizontal section of the tank, gives the quantity of liquid by weight), is also the cause of important errors. Mercury pressure gauges necessitate the correction of the influence of the temperature of the mercury; pressure gauges provided with a dial are not accurate owing to the small size of the dial; those provided with a resilient distortable casing arranged in the tank are influenced by the temperature and remanence phenomena; those having a bell located in the tank give inexact indications owing to the variation of the level of the liquid in the bell; those with downward injection of air through a vertical tube in the tank and measurement of the maximum pressure of the air have their indications influenced by the length of the tube, the rate of flow of the air, and the viscosity of the liquid of the tank, etc.

The present invention has for object to provide a pressure gauge which can be placed at the level and at the distance from the tank necessary for ensuring a practical manipulation, without its distance above the orifice ensuring communication with the interior of the tank and the distance separating it from this orifice influencing the accuracy of the measurement; it has also for object to provide a pressure gauge which is not influenced by a variation of the reference level in the tank and which automatically corrects the influence of the temperature, by thus eliminating any calculation and allowing direct reading of the pressure with an accuracy of about ±0.05 mm. of mercury column.

The present invention comprises for that purpose the use of two devices.

The first device allows of placing the pressure gauge at a practical level and distance from the orifice ensuring communication with the interior of the tank, without thereby causing any error of measurment; it is constituted by a capillary tube or a tube of small bore having a length suited to the maximum pressure to be measured, and placed on a horizontal plane at the level of the reference plane at which the pressure in the tank will be measured; this tube, filled with air, communicates, on the one hand, with the tank at this reference level, and, on the other hand, by means of a vertical or oblique extension, with the pressure gauge proper. This device is adapted to cause, by the admission of the liquid of the tank into the capillary tube, the compression of the air of the tube between the end of this column of liquid and the mercury of the pressure gauge, at a pressure independent of the momentary temperature of the air in the tube and rigorously equal to the pressure in the tank at the reference level; the variation of pressure in the tank will cause a variation in the length of the liquid column which has entered the tube, and this variation taking place on the horizontal plane mentioned will have no other influence on the indications of the pressure gauge than that due to the compression of the air.

The second device serves for the correction of the influence of the temperature on the density of the mercury of the pressure gauge. It consists in graduating the scale of the pressure gauge for the maximum temperature to which the apparatus may be exposed and in inclining the tube of the pressure gauge, together with the scale, according to an angle which is function of the temperature at the time the measurement is effected; the column of mercury, having always a tendency to rise to the level corresponding to the pressure it measures, then occupies a greater length in the inclined tube and along the graduated scale secured to the tube; the reading of the pressure is thus effected, with the required reduction of the temperature at the time the measurement is being made, at the base temperature for which the pressure gauge has been calibrated.

This device can be rendered automatic by the fact that the inclination of the tube in function of the temperature is effected without calculation by simply moving a reading rider along a fixed thermometer (which may not be graduated) arranged adjacent to the pressure gauge; this displacement of the rider is effected by the observer, owing to the fact that he seeks the meniscus of the mercury of the thermometer; the reading rider carries, for instance, an arm directed laterally towards the pressure gauge and provided at its end with a roller; this roller is in contact with a cam rigid with the manometric tube and the profile of which is cut out according to the desirable curve for inclining the pressure gauge at the angle necessary for each value of the temperature. A spring ensures the contact between the cam of the pressure gauge and the roller of the thermometer.

The column of mercury is of course in communication with the space situated in the tank above the liquid, in order to take into consideration the eventual over-pressure or depression of the air or of the gases contained in this space relatively to atmospheric pressure.

The accompanying drawing illustrates, by way of example, a form of construction of a manometric apparatus according to the invention.

Fig. 1 is a side elevation of this apparatus, the liquid tank being shown in vertical section.

Fig. 2 is a front elevation, the wall of the tank being removed.

Fig. 3 is a plan view of the lower part of the manometric tube.

Fig. 4 shows details of a scale with a rider.

In the lower part of the tank R is arranged a tube 1, the horizontal position and level of which are adjustable by screw feet 2 and which protects against deposition of impurities the inner end of a capillary tube 3. The part of this tube extending outside the tank has a horizontal portion having the necessary length and arranged in the shape of a coil 4 so as not to occupy too much room; the end of the tube outside the tank is curved upwardly to the necessary level for placing the pressure gauge at man's height, and it communicates, through a flexible tube 5, with a metallic vessel 6 containing mercury. This vessel 6 is of large cross section relatively to its height and is formed by the equatorial portion of a sphere, bounded at the top and bottom by two horizontal planes; it is mounted on two supports (not shown) through the medium of studs 7 arranged on a diameter of the original sphere, which diameter is directed from the tank towards the spot where the reading is effected. A glass tube 13 constitutes the manometric column; it is rigidly connected, on the one hand, to the bottom of the vessel 6, through a tube 19, and, on the other hand, to the upper part of the tank, through a flexible tube 16 and its rigid extension 17. A rider 15, mounted on a rack rigid with the manometric tube 13 and with a graduated scale 12, is actuated by a knob 14 and carries a drum 20 having a sufficient diameter for the reading of 0.05 mm. of mercury.

On one side is fixedly mounted a thermometer 22 provided with a reading rider 9 which can be moved on a rack by operating a knob 18. The reading rider 9 carries a side arm provided with a roller 10 in contact with a cam 11 rigid with the manometric tube 13. A spring 21 maintains the contact between the cam 11 and the roller 10. The ratio between the horizontal cross section of the vessel 6 and the cross section of the manometric tube is sufficiently high so that the maximum variation of the level of the mercury in the tube 13 may cause in the vessel 6 a variation of the level of the mercury smaller than the maximum error admitted for the reading of the mercury column in the tube 13. The vessel 6 is given the shape of a portion of sphere in order that its horizontal cross section may not vary when it is inclined.

The operation is as follows: the air column of the tubes 3, 4, 5 and of the upper part of the vessel 6 is compressed when the liquid passes from the tank to the coil 4; the compression takes place between this liquid and the surface of the mercury contained in the vessel 6, at a pressure equal to that of the liquid of the tank at the level of the orifice of the tube 3, which pressure is transmitted to the surface of the mercury in the vessel 6 and is balanced by the height of the mercury column of the tube 13. When the measurement is being effected, the meniscus of the mercury of the thermometer 22 is first read by moving the reading rider 9 to the corresponding level. By this operation, the manometric tube 13 and vessel 6 are inclined at the necessary angle, being pushed by the system comprising the roller 10 and cam 11. Then the reading rider 15 is moved to the level of the meniscus of the mercury in the tube 13, and on the graduated scale 12 rigid with this tube, the height of the mercury column is read in millimeters of mercury (the graduation can be directly made in kilograms and in fractions of kilogram); on the drum 20 the fractions are read in 0.05 mm. The number directly read is exact, the reduction of temperature being automatically effected. The capillary effect being a constant not influenced by the height of the mercury column, is constructively corrected when securing the graduated scale to the tube 13.

This application of the principles of the invention is of course a simple non-limitative example. The same principles are applicable with various modifications and in different manners. For instance, the profile of the cam can be a polar curve; the reading can be effected by means of a magnifying glass or of a vernier; the vessel 6 can be fixedly mounted, and the tube 13 alone can be inclined for the reduction of temperature, owing to a method of mounting by means of a joint on the vessel 6; if the tank is not of cylindrical or prismatic shape, the graduation of the scale 12 can be made accordingly for giving exact indications; a cock can be interposed between the coil 4 and the inlet orifice of the tube arranged in the tank for facilitating the removal of impurities contained in the tube 3 by injection of compressed air; the roller 10 might be mounted on the rider of the pressure gauge, and the cam 11 on the rider of the thermometer, or the connection between both riders might be ensured by any other suitable kinematic device, etc.

It is also to be understood that in case certain of the advantages of the manometric apparatus above described are willingly abandoned, the said apparatus can be simplified by dispensing with one or the other of the devices described, for instance by eliminating the automatic correcting device which eliminates the influence of the temperature on the evaluation of the manometric pressure, the vessel 6 being in this case fixedly mounted and the flexible tubes 5, 16 being replaced by rigid tubes, or again the device for correcting the temperature can be used in combination with a rocking pressure gauge not provided with a horizontal portion of tube equivalent to the tube 4 previously described.

I claim:

1. In a mercury pressure gauge for the measurement of the weight of a liquid contained in a tank, the combination of a tube having a small cross section and a great length, filled with a gas and one end of which opens in the said tank at the level where the pressure of the liquid is to be measured, a vessel of large horizontal cross section relatively to its height, containing mercury and in the top of which opens the other end of the said tube having a small cross section, a glass tube constituting the manometric column, extending from the bottom of the said vessel and connected to the upper part of the said tank, a graduated scale on this manometric tube, a rider adapted to be moved on the said tube and the said graduated scale, a thermometer fixedly mounted on one side of the said manometric tube, a reading rider movable on this thermometer, a side arm on this rider, a roller on this arm, a cam on the manometric tube and arranged for acting on the said roller, said manometric tube adapted to be moved to compensate for temperature variations as indicated by the thermometer and a spring for maintaining the contact between the said cam and the said roller.

2. In a mercury pressure gauge for measuring the weight of a liquid contained in a tank, the combination of a tube having a small cross section and a great length, filled with a gas and one end of which opens in the said tank at the level where the pressure of the liquid is to be measured, the said tube having, outside the tank, a horizontal portion in the shape of a coil and terminating in a vertical portion, a metallic vessel containing mercury and constituted by the equatorial portion of a sphere, bounded at the top and bottom by horizontal planes, a glass tube constituting the manometric column, extending from the bottom of the said vessel and connected to the upper part of the said tank, a graduated scale on this manometric tube, a rider adapted to be moved on the said tube and on the said graduated scale, a thermometer fixedly mounted on one side of the said manometric tube, a reading rider movable on this thermometer, a side arm on this rider, a roller on this arm, a cam on the manometric tube and arranged for acting on the said roller, said manometric tube adapted to be moved to compensate for temperature variations as indicated by the thermometer and a spring for maintaining the contact between the said cam and the said roller.

In testimony whereof I have hereunto affixed my signature.

SERVAN GEORGES CANTACUZENE.